Sept. 16, 1941.    H. R. HUGHES    2,256,116
CALCULATING DEVICE
Filed Oct. 31, 1939

INVENTOR
HOWARD R. HUGHES
BY HARRIS, KIECH, FOSTER & HARRIS
FOR THE FIRM
ATTORNEYS.

Patented Sept. 16, 1941

2,256,116

UNITED STATES PATENT OFFICE 2,256,116

CALCULATING DEVICE

Howard R. Hughes, Houston, Tex., assignor to Hughes Tool Company, Houston, Tex., a corporation of Delaware Application October 31, 1939, Serial No. 302,140

7 Claims. (Cl. 235—69)

My invention relates to calculating devices in general with special reference to devices for ascertaining ratios and expressing the ratios in standard terms for comparison. The ratios may be between any units. The preferred form of my invention, however, will find immediate use with outstanding advantages as a speed-calculator for aircraft or other transportation means when the elapsed time of travel between given terrain points is known and it is desired to express the speed of travel, or relationship between distance and time, in terms of miles per hour. For the purpose of this disclosure and to illustrate the principles involved, I shall describe my invention as embodied in such a speed-calculator, but it will be readily appreciated that the same principles may, within the scope of my concept, be applied to other basically similar calculating problems.

My invention involves the use of an extensile proportional dividing scale marked in elastic units of time, and in its simplest form consists of such an extensile scale in combination with a scale that is graduated in fixed units of distance and is calibrated for whatever map is used to represent the traversed terrain. Another form of my invention is characterized by the conception of indicating the degree of extension of such a proportional dividing scale by index means calibrated in speed units or miles per hour.

The preferred form of my invention to be specifically described herein is a combination of both of these forms since it involves an extensile proportional scale adapted for comparison with an accompanying fixed scale and involves also an indexed means for adjustably placing the proportional means under tension. This third and preferred arrangement offers a unique combination of advantages in that the fixed scale serves both for ascertaining low speed values as well as for directly measuring distances on the map, while the indexed tensioning extending means conveniently shows speed values beyond the range provided by the length of the fixed scale and makes it possible to employ a fixed scale of only moderate length.

The objects of my invention are for the most part apparent from the foregoing statements. It is my general purpose to provide a simple and rapid yet adequately accurate means for ascertaining the speed of travel for various periods of elapsed time of travel between any terrain points shown on a map representing the country traversed. By the preferred form of my invention I propose to answer at a glance the two questions of how far and how fast.

One specific object of my invention in mind is to provide a convenient manually operable means for placing and holding the proportional dividing scale under tension, and a second specific object is to provide a convenient and easily read index for expressing such tension in the terms of miles per hour.

The above and other objects and advantages of my invention will be apparent in the detailed description to follow, taken with the accompanying drawing.

Figure 1:
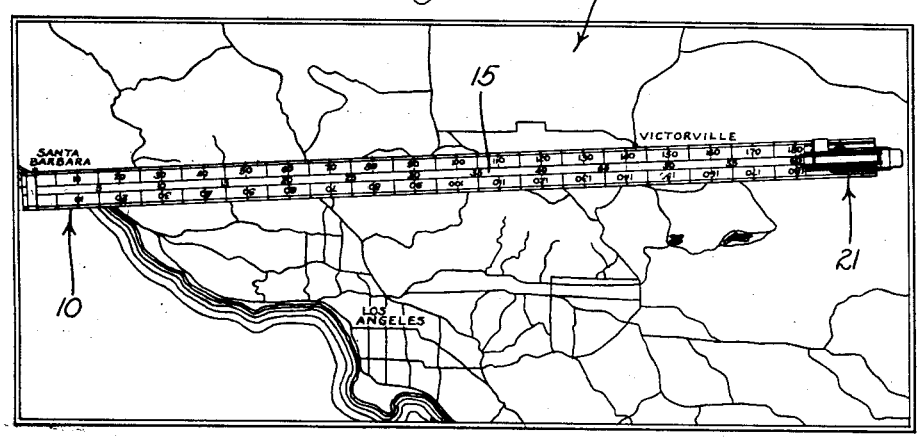
Fig. 1 shows in plan view my device as applied to a map.
Figure 2:
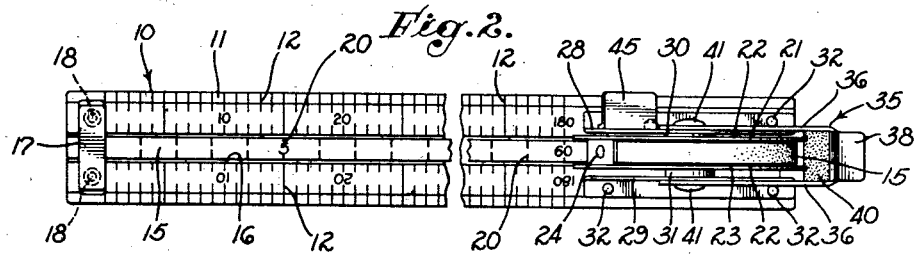
Fig. 2 is a plan view of the device itself on an enlarged scale.
Figure 4:
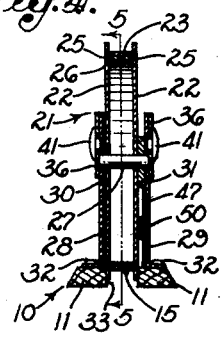
Fig. 4 is a section through the tensioning means taken as indicated by the line 4—4 of Fig. 3.

With reference to the drawing which is to be taken as illustrative only, the calculating device generally designated by numeral 10 includes an elongated base member 11 of relatively rigid material such as hard wood. The base member 11 constitutes a scale of fixed units, being marked with graduations 12 representing distance in miles on a map of given scale. Thus, if the calculating device is designed for employment with the map 13 shown in Fig. 1 and ten inches on that map represents one hundred miles, then ten inches on the base member 11 will be divided by graduations 12 representing one hundred miles. The base member 11, then, may serve as a mileage scale for direct reading of the distance between any two points on the map 13. For convenience, the graduations 12 may extend from one longitudinal side of the elongated base member to the other so that either longitudinal edge of the base member may be scanned with reference to the graduations when the device is applied to a map.

An extensile proportional dividing scale which may take the form of an elastic band 15 of rubber or like material is anchored by one end to the base member 11, the point of anchorage being near one end of the base member and at the zero point of the mileage scale formed by the graduations 12. In the preferred form of my invention shown in the drawing, the elastic band 15 lies in a longitudinal groove 16 on the upper face of the base member and is anchored by a small transverse plate 17 that is releasably clamped against the base member by suitable screws 18. The elastic band 15 is divided longitudinally by uniformly spaced graduations 20 representing minutes of elapsed time.

The simplest form of my invention may be limited to the combination of elements described to this point. To illustrate the manner in which such a device is employed, it may be assumed, for example, that an airplane passes over Santa Barbara at a certain time and 47 minutes and 40 seconds later, the pilot sights Victorville directly below his plane and wishes to know the average rate of ground speed between the two points. As indicated in Fig. 1 the pilot applies the calculating device 10 to the map 13 with the zero end of the base member 11 at Santa Barbara and the edge of the base member aligned with Victorville. The pilot or navigator then stretches the elastic band 15 by hand until the point on the band representing 47⅔ minutes falls opposite Victorville. While the elastic band 15 is thus stretched, the operator's eye shifts to the graduation on the elastic band representing 60 minutes, or one hour, and opposite that graduation reads 180 on the base member scale revealing the fact that the aircraft has traveled at an average ground speed of 180 miles per hour. If the operator is also interested in the distance between Santa Barbara and Victorville, he may note at a glance by the graduations on the base member that the distance is approximately 143 miles.

To continue the description of the preferred form of my invention, I mount on the base member 11 near the upper end of the mileage scale manually operable means to place and hold the elastic band 15 under whatever tension is required to adjust the graduations 20 of the elastic band to the factors of a given problem in speed calculation. The particular tensioning means shown in the drawing is a reel generally designated 21 that includes two face plates or discs 22 interconnected by a sheet metal cylinder 23, the cylinder comprising a metal strip with overlapping ends interconnected by a suitable rivet 24 and with lateral tongues 25 in complementary arcuate slots 26 in the two discs 22. The end of the elastic band 15 may be connected to the reel by the same rivet, the end of the band 15 being compressed between the overlapping ends of the cylinder 23. The reel 21 rotates about a pin 27 carried by a spaced pair of triangular brackets 28 and 29, a relatively thin washer 30 spacing the reel from the bracket 28 and a thicker washer 31 spacing the reel from the second bracket 29. The two brackets 28 and 29 may be attached to the base member 11 by screws 32. The longitudinal groove 16 in the base member 11 may be continued as a slot 33 in the end of the base member to provide clearance for the reel 21. For convenience in manipulating the reel 21 in tensioning the elastic band 15 and to favor engagement with a latch means described below, the peripheral edges of the discs may be serrated.

Figure 5:
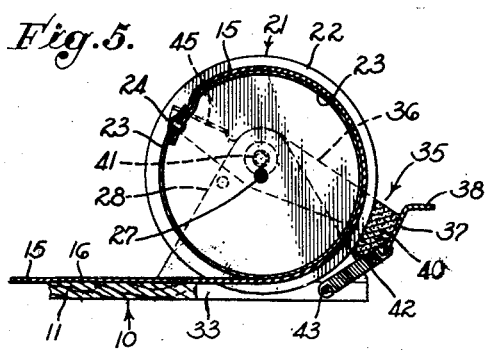
Fig. 5 is a section of the tensioning means taken as indicated by the line 5—5 of Fig. 4.

Preferably, manually releasable means is provided to fix or latch the reel 21 at any rotary position to maintain the elastic band 15 under any selected degree of tension corresponding to the factors of a given problem. Of the various types of latch means that may be employed for such purpose, I show in the drawing a frictional latch generally designated 35 comprising two arms 36 lying outside the brackets 28 and 29 respectively, the two arms being interconnected by a web 37 that is extended as an outwardly presented finger-piece 38 for manual manipulation of the latch. A shoe 40 for frictional engagement with the serrated periphery of the reel is mounted on the inner face of the web 37. The two arms 36 are pivotally mounted to the brackets 28 and 29 respectively by rivets 41, the common axis of the two rivets being spaced appreciably above the pin 27 so that the two arms are eccentrically mounted with respect to the axis of the reel 21 and therefore cause the shoe 40 to move into latching engagement with the periphery of the reel when the two arms are swung to the downward position shown in Figs. 3 and 5. A helical spring 42 connected at its upper end to the web 37 and connected at its lower end to a cross-pin 43 in the slot 33 serves to urge the two arms 36 continuously downward so that the frictional latch 35 is normally effective and releases the reel only when held out of its normal latching position by manual exertion on the part of the operator. For convenience in manipulating the latch means 35, one of the two arms 36 may be extended upward and formed into a second finger-piece 45 which may be depressed to release the reel.

Any suitable index means may be employed to indicate the relative rotative position of the reel 21 and thereby the degree to which the elastic band 15 has been stretched to provide the solution to any given problem in speed calculation. In the preferred form of my invention, I mark on the disc 22 of the reel opposite the triangular bracket 29 a spiral series of graduations 46 to be read with reference to any suitable fixed pointing means. For example, I may place a window 47 in the bracket 29 and mark on the window a vertical hairline 48 for such purpose. Such a window may comprise a non-breakable transparent sheet placed against an opening 49 cut in the bracket, a pair of tongues 50 being provided to hold the window in place.

Figure 3:
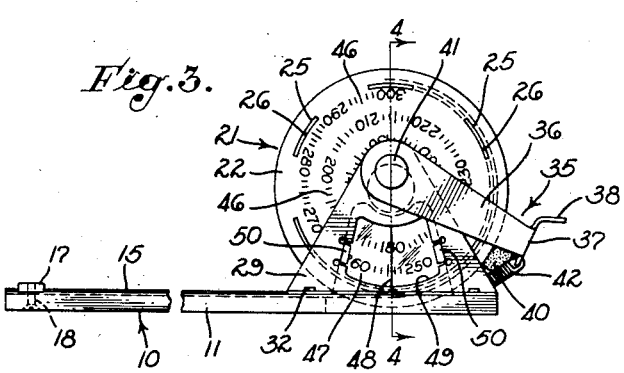
Fig. 3 is a side elevation of Fig. 2.

The operation of this more refined form of my invention may be readily understood from the foregoing description. In solving the previously stated problem, for example, the calculating device is applied to the map 13 in the same manner as heretofore recited, but instead of stretching the elastic band 15 directly by hand, the operator merely rotates the reel 21 until the point on the elastic band representing 47⅔ minutes is brought opposite the location of Victorville on the map. The operator may then read the ground speed, 180 miles per hour, directly from the scale on the base member as previously described, or may read the same answer through the window 47 as shown in Fig. 3. In the particular problem selected, the answer may be read in either of the two places, but if the ground speed of the aircraft is so high that the tensioning of the elastic band 15 carries the 60 minute point on the elastic band onto the reel 21, the answer may be found only by referring to the index on the reel. While I prefer to provide the base member 11 with the mileage scale represented by the graduations 12, it is apparent that such mileage scale may be omitted and the answer in all cases read from the scale on the reel 21, in which case the graduations 46 on the reel may be said to be calibrated both with the scale of the map 13 and the spacing of the time graduations on the elastic band.

The arrangement shown may be adapted to similar calculating problems in other fields. For example, the fixed scale on the base member 11 may express units of numerical quantity and the scale on the elastic band 15 may represent units of weight, so that if it is known that a given number of uniform objects weigh a given number of ounces, the elastic band may be stretched to ascertain at a glance the number of such uniform objects that will weigh one pound. Other uses for the invention may be readily conceived.

The preferred form of my invention herein described in specific detail will, of course, suggest to those skilled in the art various changes, modifications, and substitutions that do not depart from my underlying inventive concept, and I specifically reserve the right to all such changes, modifications, and substitutions that properly come within the scope of my appended claims.

I claim as my invention:

1. A calculating device of the character described, comprising in combination: a relatively rigid elongated member; an elastic proportioning scale attached by its zero end to said member and adapted to be stretched to place a selected point on the elastic scale opposite a selected point on the rigid member so that the ratio of the value of each graduation on the elastic scale relative to the distance of the graduation from said zero point is the same as the ratio of the value of said selected scale point to the distance of said selected scale point from said zero point; rotary means on said member attached to said elastic scale to adjustably stretch the elastic scale; and index means to indicate the extent to which said rotary means is rotated to stretch the elastic scale, said index means being calibrated to indicate said ratio.

2. A speed-calculating device for use with a map to ascertain the rate of travel between various terrain points for various periods of elapsed time, comprising in combination: an extensile proportional dividing scale graduated to represent units of time and adapted to be adjusted to cause various time points on the scale corresponding to various periods of elapsed time to be separated by the map spacing corresponding to ground distance between various terrain points; and winding means attached to one end of said extensile scale for cooperation with the extensile scale, said means having an index calibrated with said map to indicate what terrain distance corresponds with a selected unit of time on said extensile scale.

3. A device as set forth in claim 2 in which said attached means is a scale adapted to be applied to the map to indicate both the distance between terrain points as well as the terrain distance corresponding to said selected unit of time.

4. A speed-calculating device for use with a map to ascertain the rate of travel between various terrain points for various periods of elapsed time, comprising in combination: an elastic means having a scale marked in units of elapsed time; means for stretching said member along said map with the zero point of said scale at one selected map point and a point of the scale corresponding to a selected period of elapsed time at a second selected map point; and means operated by said stretching means to indicate while said elastic means is thus stretched the map distance between points on said scale representing a standard period of time for speed rating.

5. A speed-calculating device for use with a map to ascertain the rate of travel between various terrain points for various periods of elapsed time, comprising in combination: an elongated base member adapted to extend along the surface of said map; an elongated elastic member anchored by one end to said base member and having a scale in units of time, the zero point of the scale being at the point of anchorage; means on said base member spaced from the point of anchorage of said elastic member and adapted to adjustably stretch said elastic member along the base member whereby the zero point on said scale may be placed at one selected map point and a second point on the scale corresponding to a selected period of elapsed time may simultaneously be placed at a second selected map point; and means responsive to said stretching means to indicate the distance for a standard unit of time corresponding to the degree to which said elastic member is stretched to place said two scale points at said two selected map points.

6. A speed-calculating device for use with a map to ascertain the rate of travel between various terrain points for various periods of elapsed time, comprising in combination: a base member adapted to extend along the surface of said map; an elongated elastic member anchored by one end to said base member and having a scale in units of time, the zero point of the scale being at the point of anchorage; a reel mounted on said base member spaced from the point at which said elastic member is anchored and engaging one end of the elastic member for reeling in the elastic member, thereby stretching the unreeled portion of the elastic member, whereby the zero point on the scale of the elastic member may be placed at one selected map point and a second scale point on the unreeled portion of the elastic member may simultaneously be placed at a second selected map point; and index means to indicate the extent said reel is rotated in stretching the elastic member, said index means being calibrated in units of map distance for a standard unit of time.

7. A device as set forth in claim 2 in which said index includes a spiral scale on said winding means and a stationary reference means adjacent thereto.

HOWARD R. HUGHES.